INVENTOR
E. R. KRETZMER
BY W. L. Keefauver
ATTORNEY

RECEIVING TERMINAL

INVENTOR
E. R. KRETZMER
BY W. L. Keefauver
ATTORNEY

United States Patent Office 2,949,505

Patented Aug. 16, 1960

2,949,505

REDUCED BANDWITH TRANSMISSION SYSTEM

Ernest R. Kretzmer, New Providence, N.J., assignor to Bell Telephone Laboratories, Incorporated, New York, N.Y., a corporation of New York Filed Aug. 14, 1957, Ser. No. 678,193

20 Claims. (Cl. 179—15.6)

Figure 1A:
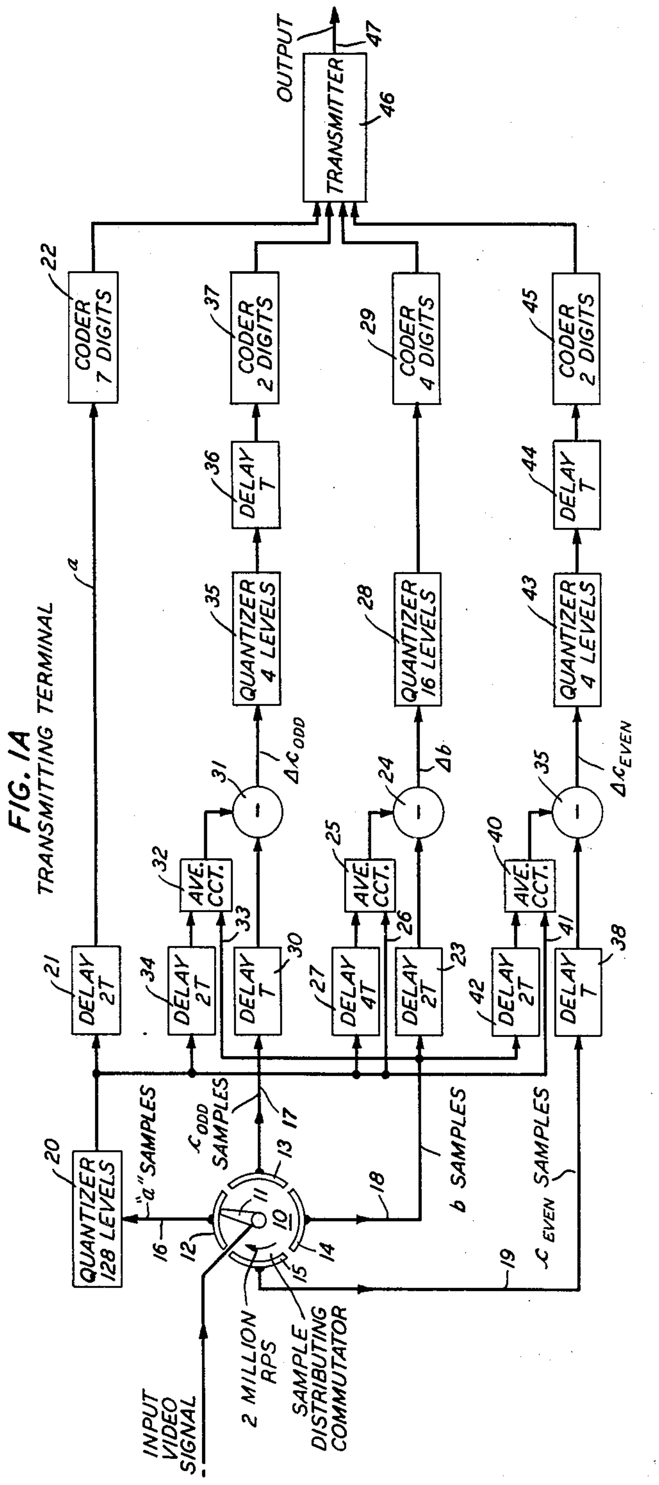

This invention relates to the transmission and reception of electrical communication signals and, more particularly, to the transmission and reception of electrical communication signals which ordinarily require considerable transmission channel capacity.

It is an object of the present invention to effect a reduction in the transmission channel capacity required for the transmission of such signals.

In order to insure faithful reproduction at the receiver of the entire range of frequencies and amplitudes contained in communication signals, for example, television signals, many present day communication systems employ broad band transmission channels. Such broad band transmission facilities are generally very expensive and workers in the art are therefore constantly seeking ways and means of reducing the channel bandwidth or capacity required. Because it is well known that the frequency bandwidth required for the transmission of satisfactory television images depends both upon the properties of the eye such as persistence of vision, acuity, and upon the departures from perfection which the observer regards as tolerable, transmission systems have been proposed which take advantage of these tolerances.

For example, one approach has been to make use of a process of sampling and quantizing, which converts continuous scales of time and amplitude, respectively, into discrete scales, permitting representation of the signal by a finite number of code symbols chose from an "alphabet" containing a finite number of symbols. As disclosed in United States Patent 2,681,385, issued to B. M. Oliver on June 15, 1954, sampling alone does not entail any loss of information if the sampling frequency is at least twice as great as the highest frequency of interest in the intelligence. In such case, the effects of sampling are not discernible in the final signal. Quantization likewise does not entail any discernible loss of information if the number of quantizing levels is sufficiently high, but at the same time a large required channel capacity results from the use of a large number of levels.

Heretofore, efforts to reduce channel bandwidth requirements by reducing the number of quantizing levels have given rise to annoying defects in the picture as finally viewed at the receiver. Since quantizing the signal divides the brightness range of the picture into a finite number of brightness subranges, each subrange being represented by a single level, any gradual change in brightness across the picture will appear as a series of discrete steps, that is, there will be visible equal-brightness contours in the picture. In addition, where there is a large area in the picture having a uniform brightness near the limit of one quantizing range, a small amount of noise may randomly shift the amplitudes of samples of the picture signal into the next quantizing range, giving rise to defects in the picture which can be quite disturbing to the viewer. It has been necessary, therefore, to quantize at a sufficiently large number of levels to prevent these picture defects from becoming intolerable to the viewer. However, when such a number of levels is used, encoding the quantized signal in order to reduce channel bandwidth requirements becomes impractical.

Other proposed systems overcome this difficulty by utilizing what is termed a differential quantization. In such a system, instead of transmitting the quantized signal samples themselves, the differences between successive quantized samples are coded and transmitted. As disclosed in C. C. Cutler Patent 2,605,361, issued July 24, 1952, differential quantizing systems have transmission channel bandwith because a smaller number of quantizing levels are needed to represent adequately the sample differences than to represent the samples themselves. In such a system, however, an error in the signal transmitted is carried over to succeeding samples, thus distorting an entire series of received samples and making the distortion cover a discernible area.

The present invention is directed to a system which effects a reduction in required channel capacity by the use of absolute amplitude quantization of one sample sequence and multiple differential quantization to various degrees carried on between interleaved sample sequencs, including the one sample sequence, rather than between successive samples.

In accordance with the present invention, samples are derived from the broad band signal comprising a plurality of intercalated sample sequences. A first set, for example, comprises every fourth one of all of the samples. A second set comprises those samples falling midway between the samples of the first set, and a third set comprises those samples falling midway between adjacent samples of the first and second sets. The first set of samples is quantized and coded to a large number of quantization levels, providing an accurate "skeleton" of the signal. The second set is differentially quantized to a smaller number of levels and the third set is differentially quantized to an even smaller number of levels. This multiple differential quantization to succeedingly coarser quantum levels enables transmission to be carried on with a substantially reduced channel capacity and hence bandwidth and with a degradation of the composite signal which is substantially indiscernible to the human senses.

In particular, the first set of samples, in an illustrative embodiment, is finely quantized and transmitted. The samples of the second set are not themselves transmitted, but are each compared with the average of the two flanking samples of the first set and only the difference is sent. Similarly, the samples of the third set are not themselves transmitted, but are each compared with the average of the adjacent sample of the first set and the adjacent sample of the second set and only the difference is sent. Succeedingly coarser differential quantizations are therefore superimposed on a finely defined "skeleton" of the signal. In this way, the bandwidth reducing advantages of differential quantization is retained while the cumulative distortion error of successive differential quantization is avoided.

These and other objects and features, the nature of the present invention and its various advantages, will be more fully understood upon consideration of the accompanying drawings and of the following detailed description of the drawings.

Figure 1B:
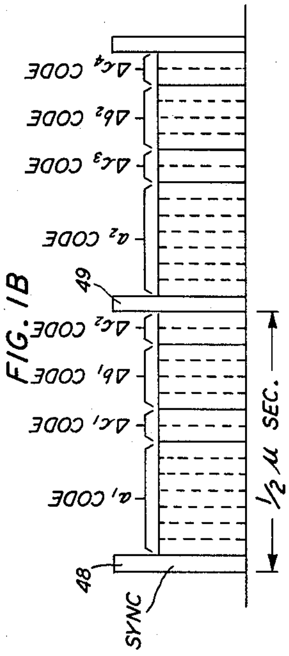
Figure 2:
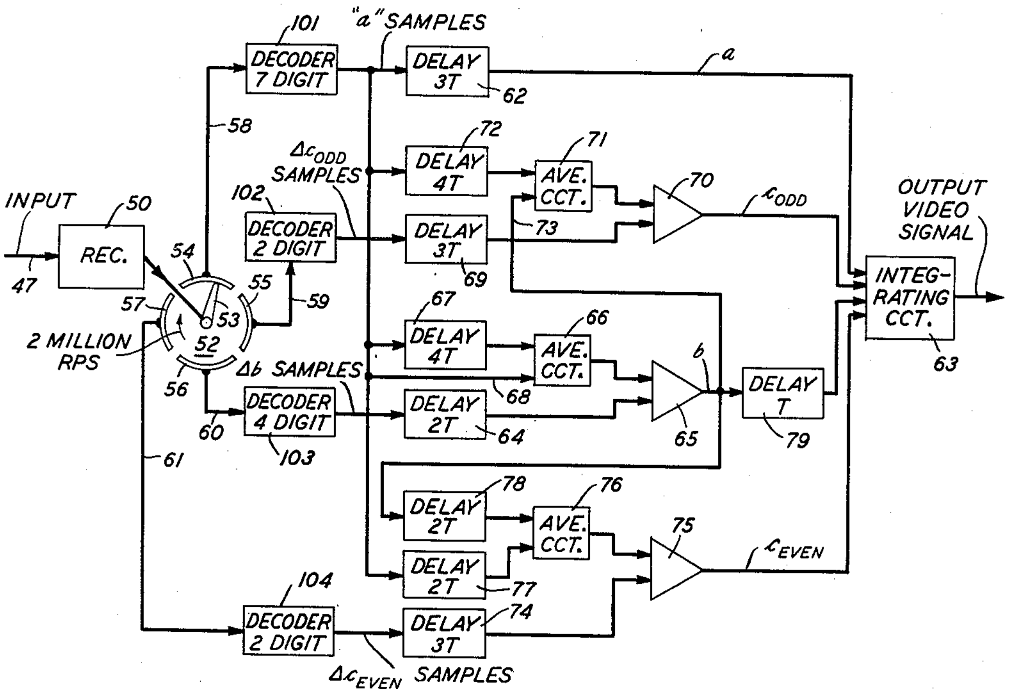
Figure 3:
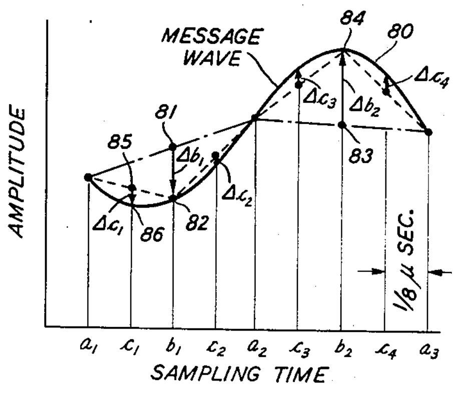
Figure 4:
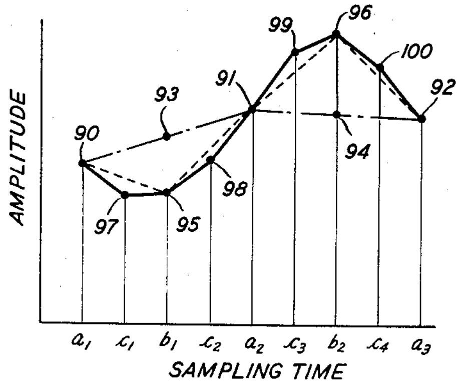

In the drawings:

Fig. 1A is an overall block diagram of a television transmitting terminal which embodies the principles of the invention;

Fig. 1B, given for the purposes of illustration, is a graphical representation of a serial code grouping which might be used with the present invention;

Fig. 2 is an overall block diagram of a television receiving terminal which embodies the principles of the invention;

Fig. 3, given for the purposes of illustration, is a graphical and qualitative representation of the sampling and differential quantizing operations taking place in the transmitter of Fig. 1; and Fig. 4, also given for the purposes of illustration, is a graphical and qualitative representation of the decoding and signal reconstruction operation taking place in the receiver of Fig. 2.

The invention will be explained hereinafter as applied to the transmission and reception of television video signals although it is not intended to be limited to the transmission of such signals, inasmuch as the principles of the invention are readily applicable to the transmission and reception of other types of electrical communication signals.

With reference now to Fig. 1A, there is shown a television signal transmitting terminal employing the principles of the invention. A complete video signal, which may be the standard RTMA signal derived from a video camera and associated amplifiers, not shown, is supplied to a sample distributing commutator 10 which samples the video signal by means of a rotating brush 11 successively contacting commutator segments 12, 13, 14 and 15. Commutator 10 is shown, for the purposes of illustration, as a mechanical commutator rotating at a speed of two million revolutions per second. In an actual embodiment of the invention, however, commutator 10 would comprise an electronic commutator driven by a controlled frequency oscillator, not shown.

Commutator 10 delivers samples of the video input signal in sequence to lines 16, 17, 18 and 19 by way of commutator segments 12, 13, 14 and 15, respectively. These samples are of equal duration and adjacent samples, i.e., samples taken from adjacent commutator segments, are spaced in time by a period T which, in the illustrative embodiment, is one-eighth of a microsecond. For convenience, these samples have been termed the "*a*" samples, delivered by way of commutator segment 12 to line 16, the "*b*" samples, delivered by way of commutator segment 14 to line 18, the "odd *c*" or "$c_{odd}$" samples, delivered by way of commutator segment 13 to line 17, and the "even *c*" or "$c_{even}$" samples, delivered by way of commutator segment 15 to line 19.

In accordance with the present invention, the *a* samples are finely quantized, coded and transmitted to the receiving terminal. The *b* samples are not themselves transmitted, but are each compared with the average of the two flanking *a* samples and only the difference, $\Delta b$, is quantized, coded and transmitted. Similarly, the *c* samples are not themselves transmitted, but are each compared with the average of the flanking *a* and *b* samples and only the difference, $\Delta c$, is quantized, coded and transmitted. That is, each of the odd *c* samples is compared with the average of the preceding *a* sample and the succeeding *b* sample while each of the even *c* samples is compared with the average of the preceding *b* sample and the succeeding *a* sample. The $\Delta b$ and $\Delta c$ samples are, of course, subjected to succeedingly coarser quantization as compared to the quantization of the *a* samples. The means by which the multiple differential quantization to succeeding coarser quantum levels is accomplished will now be examined.

Considering now a video signal which may be typically four megacycles in bandwidth and which is supplied to commutator 10, the signal is repetitively sampled at a predetermined rate, for example, in the illustrative embodiment, at eight megacycles. These samples are divided into three intercalated sample sequences, those samples hereinbefore termed *a* samples belonging to a first sequence, those termed *b* samples belonging to a second sequence, and those termed *c* samples belonging to a third sequence. The *a* sample sequence comprises every fourth sample of all the samples taken. The *b* sample sequence comprises every fourth sample taken midway between successive *a* samples, and the *c* sample sequence comprises every other sample taken midway between adjacent *a* and *b* samples. The *c* sample sequence is in turn divided into the odd *c* sample sequence, comprising every *c* sample preceded by an *a* sample and succeeded by a *b* sample, and the even *c* sample sequence, comprising every *c* sample preceded by a *b* sample and succeeded by an *a* sample. It is to be understood that the eight-megacycle sampling rate specified and the use of three intercalated sample sequences are illustrative only and are not intended to be limiting since the principles of the invention are applicable to other sampling rates and to any number of intercalated sample sequences. The relationship of these samples and sample sequences is graphically illustrated in Figs. 3 and 4, to be more fully considered below.

Returning to Fig. 1A, the *a* samples, forming an *a* sample sequence, are delivered by way of line 16 to a quantizer 20 where these samples are finely quantized, for example, to 128 levels. Quantizers capable of performing this function are well known in the art and will not be described in detail since this unit in itself forms no part of the invention. The output of quantizer 20 comprises a finely quantized *a* sample sequence which is delayed for a period of time 2T by delay circuit 21 which may be any well known type of delay network. As discussed above, in the illustrative embodiment given here the period T is equal to approximately one-eighth microsecond which is the period of time required for one sampling interval at the commutator 10, that is, the period of time between the contact of brush 11 with adjacent segments, for example, segments 12 and 13. This delay is necessary to deliver the *a* sample sequence to the output in the proper time relationship to the *b* and *c* sample sequences.

The output of delay circuit 21, which comprises a plurality of pulses of discrete amplitude levels, is then supplied to a coder 22 wherein an encoding process is accomplished. Coder 22 may take any one of a number of forms depending on such things as the signal-to-noise ratio of the transmission channel and the particular type of transmission desired. It is to be noted, however, that in accordance with the illustrative embodiment of the invention, the output of coder 22 comprises a signal with an information capacity of seven bits per sample, corresponding to the 128 quantizing levels of quantizer 20, and which may include synchronizing information. This may, for example, be a binary pulse code modulated signal.

Considering now the *b* sample sequence appearing on line 18, these samples are delivered to a delay circuit 23, similar to delay circuit 21 and also having a delay period of 2T, and then to a subtractor circuit 24, which may be a differential amplifier or any other form of subtractor well known in the art. The other input to subtractor 24 is derived from an averaging circuit 25, which may be a summing amplifier or any other averaging network well known in the art. Averaging circuit 25 derives the average of two adjacent quantized *a* samples. Thus, a first *a* sample is delivered directly by way of line 26 to averaging circuit 24 and a second *a* sample is delivered to averaging circuit 24 by way of delay circuit 27. Circuit 27, similar to circuits 21 and 23, has a delay of 4T. Since 4T is the period between successive *a* samples, circuit 25 is able to derive the average of these successive *a* samples and deliver this average to subtractor 24.

Hence it is seen that the *b* sample midway between each pair of successive *a* samples is subtracted from the average of these successive *a* samples. The difference, $\Delta b$ is delivered to a second quantizer 28 similar to quantizer 20 except that quantizer 28 quantizes the $\Delta b$ samples to a number of quantum levels substantially less than the number provided in quantizer 20, for example, 16 levels rather than 128 levels. The output of quantizer 28 is fed into a coder 29 similar to coder 22 except that its output comprises a signal having an information capacity of four bits per sample, corresponding to the 16 quantizing levels of quantizer 28.

The odd $c$ sample sequence, delivered by line 17, is delayed for a period T in delay circuit 30 and delivered to a second subtractor circuit 31 similar to subtractor circuit 24. The other input to subtractor circuit 31 is obtained from a second averaging circuit 32, similar to averaging circuit 25. Averaging circuit 32 takes an undelayed $b$ sample, by way of line 33, and an $a$ sample, delayed in delay circuit 34 for a period of 2T, and produces at its output the average of these two samples. Thus the output of averaging circuit 32 comprises the average of the $a$ sample preceding the odd $c$ sample and the $b$ sample succeeding this odd $c$ sample. This output is subtracted from the odd $c$ sample in subtractor circuit 31 and the difference, $\Delta c_{odd}$, is delivered to a third quantizer 35. Quantizer 35 is similar to quantizers 20 and 28 except that it quantizes the $\Delta c_{odd}$ samples to a number of quantum levels substantially less than the number provided in quantizer 28, for example, four levels rather than 16 levels. The output of quantizer 35 is delayed for a period T by delay circuit 36 and fed into coder 37, similar to coders 22 and 29 but providing an output having an information capacity of two bits per sample, corresponding to the four quantizing levels of quantizer 37.

The even $c$ sample sequence, delivered by line 19, is delayed for a period T by delay circuit 38 and fed into a subtractor circuit 39 similar to subtractor circuits 24 and 31. The other input to subtractor circuit 39 is obtained from a third averaging circuit 40 similar to averaging circuits 25 and 32. Averaging circuit 40 takes an undelayed $a$ sample, by way of line 41, and a $b$ sample, delayed in delay circuit 42 for a period of 2T, and produces at its output the average of these two samples. Thus the output of averaging circuit 40 comprises the average of the $a$ sample succeeding the even $c$ sample and the $b$ sample preceding this odd $c$ sample. This output is subtracted from the even $c$ sample in subtractor 39 and the difference, $\Delta c_{even}$, is delivered to a fourth quantizer 43. Quantizer 43 is similar to quantizer 35 and quantizes the $\Delta c_{even}$ samples to the same number of quantum levels as the $\Delta c_{odd}$ samples are quantized to in quantizer 35, in the illustrative embodiment, to four levels. The output of quantizer 43 is delayed for a period T by delay circuit 44 and fed into a coder 45 similar to coder 37, providing an output having an information capacity of two bits per sample corresponding to the four quantizing levels of quantizer 43.

It is thus in accordance with the invention to derive three intercalated sample sequences and to transmit a first sample sequence very accurately, to derive and transmit the difference between a second sample sequence and the average of adjacent samples from the first sample sequence less accurately, and to derive and transmit the difference between the third sample sequence and the average of adjacent samples from the first and second sample sequences still less accurately. Similarly, it is in accordance with the invention to quantize the first sample sequence to a large number of quantum levels, to differentially quantize the second sample sequence to a lesser number of quantum levels, and to differentially quantize the third sample sequence to a still smaller number of quantum levels.

It can be seen that the advantage to be gained by the quantizing described above is a substantial saving of required channel capacity and hence of bandwidth for a given type of system, e.g., binary PCM. Where four successive samples normally require 28 (four times seven) bits to be represented, in the present system only 15 (seven plus four plus two plus two) bits are required to transmit the same information, a saving of almost 50 percent. This may be turned into a direct bandwidth saving in a sequential pulse code modulation system by reducing the average number of bits per sample. Similarly, if parallel digit transmission is used, a direct saving in the number of parallel paths required is accomplished.

Thus coders 22, 29, 37 and 45 in Fig. 1A are fed into transmitting apparatus 46 which operates upon the various code pulses to prepare them for transmission such as, for example, performing an appropriate time interleaving or digit separation and, in addition, frequency modulating and multiplexing if required. The signal thus derived is transmitted over a transmission facility 47 which may comprise a number of parallel paths, a broad band transmission cable or a radio or microwave link, depending upon the mode of transmission chosen and the facilities available.

The exact proceduce described above for deriving the various differences is illustrative only and is not to be taken in any limiting sense. Alternatively, the $\Delta c$ sample sequences may, for example, be derived by comparison of the $c$ samples to a "weighted" average of flanking $a$ samples without reference to the $b$ sample sequence. In any event, however, the second sample sequence is quantized more coarsely than the first sequence and the third sample sequence is quantized more coarsely than the second.

In Fig. 1B there is shown one illustrative example of a code sequence for transmitting the information derived by the circuit of Fig. 1A. It is assumed that it is desired to transmit the code groups serially rather than in parallel. Thus a synchronizing pulse interval 48 is followed by a seven digit code group interval, corresponding to the $a$ sample, then by a two digit code group interval, representing an odd $\Delta c$ sample, then a four digit code group interval, representing a $\Delta b$ sample, and finally a two digit code group interval, representing an even $\Delta c$ sample. This series of sixteen pulse positions is immediately followed by another synchronizing pulse interval 49 and another series of code group intervals representing the $a$, $\Delta c_{odd}$, $\Delta b$, and $\Delta c_{even}$ samples, respectively. These sequences may be obtained, for example, merely by delaying the various code groups sufficiently for them to fall into the proper position. This is, of course, only one of many possible schemes for transmitting the various code groups.

A receiving terminal will now be described which is suitable for receiving the pulse coded signal transmitted by the transmitting terminal of Fig. 1A and reconstructing the analogue signal therefrom. It is to be understood that this receiving terminal, shown in Fig. 2, is illustrative only, representing one suitable way of recovering the original signal, and should not be taken as limiting.

Going to Fig. 2, there is shown a receiving terminal in accordance with the present invention comprising a receiver 50 to which transmission line 47 is connected. Receiver 50 separates and demodulates the individual code groups corresponding to the $a$, $b$ and $c$ sample sequences in a manner opposite to that by which they were combined in transmitter 46 and delays the various groups to form the same series introduced into transmitter 46. In the illustrative embodiment, for example, the output of receiver 50 comprises a series of code groups representing the quantized value of the $a$ sample sequence coded to 128 different levels, the $\Delta b$ sample sequence coded to 16 different levels and the $\Delta c$ sample sequence coded to four different levels, all in the sequence in which they were transmitted. This operation may, for example, be timed by a synchronizing signal transmitted from transmitter 46 of Fig. 1A.

The output of receiver 50 is introduced into a sample distributing commutator 52 which delivers the code pulse groups by way of brush 53 successively to commutator segments 54, 55, 56 and 57. Commutator 52, shown for the purposes of illustration as a mechanical commutator rotating at a speed of two million revolutions per second, is similar to commutator 10 shown in Fig. 1A and in an actual embodiment of the invention would comprise an electronic commutator. Commutator 52 is synchronized with commutator 10, by synchronizing equipment not shown, in such a manner that the code groups representing the $a$ samples obtained from the commutator segment 12 of commutator 10 is delivered by way of commutating segment 54 of commutator 52 to line 58. Similarly, the code groups representing the odd $\Delta c$ samples are delivered by way of commutating segment 55 to line 59, the code groups representing the $\Delta b$ samples are delivered by way of segment 56 to line 60 and the even $\Delta c$ samples are delivered by way of segment 57 to line 61. Of course, if parallel digit transmission is used, commutator 52 is unnecessary.

The pulse groups corresponding to the $a$ samples are delivered by way of line 58 to a decoder 101. Decoder 101 decodes the seven digit pulse groups corresponding to the $a$ samples and delivers these decoded pulse samples (replicas of the original $a$ samples) to a delay circuit 62, providing a delay of 3T, and thence to an integrating circuit 63. Decoder 101 may be any one of the many binary decoders well known in the art.

The pulse groups corresponding to the $\Delta b$ samples are delivered to a decoder 103 similar to decoder 101. Decoder 103 decodes the four digit pulse groups corresponding to the $\Delta b$ samples and delivers these decoded samples to a delay circuit 64. The samples are delayed for a period of 2T in delay circuit 64 and delivered to a summing amplifier 65. Also delivered to summing amplifier 65 is the output of averaging circuit 66 which derives the average of a first $a$ sample, delayed in delay circuit 67 for a period of 4T, and a second undelayed $a$ sample by way of line 68. Since 4T is the period between adjacent $a$ samples averaging circuit 66 takes the average of successive $a$ samples and summing amplifier 65 adds to this average the intervening $\Delta b$ sample. This process is just the reverse of the process carried on in the transmitting terminal of Fig. 1 for deriving the $\Delta b$ sample. The output of summing amplifier 65 therefore comprises what has been termed the $b$ sample sequence. Each individual $b$ sample of this sequence has been obtained by taking the average of two successive $a$ samples and adding thereto the intervening $\Delta b$ sample. These $b$ samples are delayed for a period of T in delay circuit 79 and delivered to integrating circuit 63.

The pulse groups corresponding to the $\Delta c_{odd}$ sample sequence are delivered by way of line 59 to decoder 102 which decodes these two digit pulse groups. Decoder 102 delivers the decoded samples to delay circuit 69, having a delay period of 3T, and thence to a summing amplifier 70 similar to summing amplifier 65. Also delivered to summing amplifier 70 is the output of averaging circuit 71 which derives the average of an $a$ sample, delayed for a period of 4T in delay circuit 72, and a $b$ sample undelayed in time and delivered by way of line 73 from the output of summing amplifier 65. Thus averaging circuit 71 derives the average of the preceding $a$ sample and the succeeding $b$ sample and summing amplifier 70 adds to this average the $\Delta c_{odd}$ sample, thus providing at its output the $c_{odd}$ sample sequence. This $c_{odd}$ sample sequence is also delivered to integrating circuit 63.

The pulse groups corresponding to the $\Delta c_{even}$ sample sequence are delivered by way of line 61 to decoder 104 which decodes these two digit pulse groups. Decoder 104 delivers the decoded samples to delay circuit 74 and thence to a summing amplifier 75 similar to summing amplifiers 65 and 70. Delay circuit 74 has a delay period of 3T and is similar to the other delay circuits described herein. Also delivered to summing amplifier 75 is the output of averaging circuit 76 which derives the average of an $a$ sample, delayed by delay circuit 77 for a period of 2T, and a $b$ sample, delayed for a period of 2T in delay circuit 78. Thus averaging circuit 76 takes the average of the succeeding $a$ sample and the preceding $b$ sample and summing amplifier 75 adds to this average the $\Delta c_{even}$ samples delivered by way of delay circuit 74. The output of summing amplifier 74 therefore comprises the $c_{even}$ sample sequence, which is also delivered to integrating circuit 63.

The pulse samples from the various channels are delivered to integrating circuit 63 in a time sequence and are therein integrated to form a continuous wave. This continuous wave, delivered at the output of integrating circuit 63, comprises a replica of the input video signal initially delivered to commutator 10 in the transmitting terminal of Fig. 1A integrating circuit 63 may, for example, comprise a low pass filter having an upper frequency limit of twice the highest frequency component of the signal wave or, in the illustrative example, eight megacycles.

The transmission system described above is capable of transmitting video signals with only about one-half of the channel capacity required to transmit all of the pulse samples when quantized to 128 levels. In accordance with the present invention, the reduced number of quantizing levels required for differentially quantizing the $b$ and $c$ sample sequences leads directly to a reduced number of code pulses per sample. The system described has thus demonstrated one means for saving channel bandwidth by the use of multiple differential quantization between intercalated sample sequences to succeedingly coarser quantum levels.

In Fig. 3 is shown, for the purposes of illustration, a graphical and qualitative representation of a video signal wave which might comprise a portion of the input video signal delivered to the transmitting terminal of Fig. 1A. Thus, a message wave 80 is sampled at one-eighth microsecond intervals. Every fourth one of these samples comprises an $a$ sample and has, therefore, been given this designation with a suitable subscript to denote its position in the sequence. Thus, the first sample is the $a_1$ sample, the fifth sample is the $a_2$ sample and the ninth sample as is the $a_3$ sample. These $a$ samples are, in accordance with the invention, finely quantized to 128 levels, thus providing a finely quantized "skeleton" of the signal wave.

Those samples taken midway between successive $a$ samples are termed the $b$ samples. Thus, the third sample has been termed the $b_1$ sample and the seventh sample has been termed the $b_2$ sample. In accordance with the present invention, the $b$ samples are compared to the average of the two flanking $a$ samples and only the difference $\Delta b$ is transmitted. Thus, in Fig. 3 only the difference between the average of the $a_1$ and $a_2$ samples, represented by point 81, and the $b_1$ sample, represented by point 82, is quantized, coded and transmitted. Similarly, the difference between the average of the $a_2$ and $a_3$ samples, represented by point 83, and the $b_2$ sample, represented by point 84, is quantized, coded and transmitted.

The $c$ samples, appearing between adjacent $a$ and $b$ samples, are divided into odd $c$ samples and even $c$ samples. The odd $c$ samples, for example, $c_1$, are preceded by an $a$ sample ($a_1$) and succeeded by a $b$ sample ($b_1$). The even $c$ samples, on the other hand, such as, for example, $c_2$, are preceded by a $b$ sample ($b_1$) and succeeded by an $a$ sample ($a_2$). In accordance with the present invention, the $c$ samples themselves are not transmitted but are compared to the average of the flanking $a$ and $b$ samples and only the difference, $\Delta c$, is quantized, coded and transmitted. Thus, in Fig. 3 the average of the $a_1$ and $b_1$ samples, represented by point 85, is compared to the $c_1$ sample, represented by point 86, and only the difference, $\Delta c_1$, is quantized, coded and transmitted. Similarly, every other $c$ sample is compared with the average of the flanking $a$ and $b$ samples and the difference is quantized, coded and transmitted.

Proceeding to Fig. 4, there is shown, for the purposes of illustration, a graphical and qualitative representation of the reconstruction of the message wave 80 shown in Fig. 3. Thus, the $a$ samples, having been finally quantized and themselves transmitted, provide an accurate skeleton of the message wave represented by points 90, 91 and 92. In order to ascertain the value of the message wave at the time of the intervening *b* samples, the average of successive *a* samples, shown at points 93 and 94, are taken and to them is added the $\Delta b$ samples which have been transmitted, thus giving those values of the message wave represented by points 95 and 96.

Similarly, in order to ascertain the value of the message wave at points between successive *a* and *b* samples, the average of these successive samples as taken and the $\Delta c$ samples are added thereto, giving the points 97, 98, 99 and 100. Line segments connecting successive ones of these signal values, such as that shown by line 101, will provide a reasonably accurate representation of the transmitted wave. Discontinuities in wave 101 can be removed by a filtering process where the filter is of the low pass variety and has a cut-off frequpency of twice the highest frequency component of the message wave.

It is to be understood that the above-described arrangements are only illustrative of the numerous and varied other arrangements which could represent applications of the principles of the invention. Such other arrangements may readily be devised by those skilled in the art without departing from the spirit and scope of the invention.

What is claimed is:

1. Transmission apparatus comprising means for deriving from a signal to be transmitted a regular succession of signal samples, means for subdividing said succession of samples into a plurality of intercalated sample sequences, means for quantizing the amplitudes of the several samples in a first one of said sequences to a first number of quantizing levels, means for adding the amplitudes of the samples of said first sequence to form a first sum, means for subtracting from said first sum the amplitudes of the samples of a second one of said sequences to drive a first succession of differential samples, means for quantizing the amplitudes of the samples of said first succession to a second number of levels, means for adding the amplitudes of the samples of said first sequence to the amplitudes of the samples of said second sequence to form a second sum, means for subtracting from said second sum the amplitudes of the samples of a third one of said sequences to derive a second succession of differential samples, means for quantizing the amplitudes of the samples of said second succession to a third number of levels, and means for transmitting these quantized signal sample amplitudes to a receiver station.

2. Transmission apparatus comprising means for deriving from a signal a plurality of intercalated sample sequences of ascending order, means for deriving the average amplitudes of successive samples of a first order sequence, means for differentially combining the amplitudes of said average amplitude samples and the amplitudes of intervening samples of a second order sequence to form first order differential samples, and means for quantizing each of said sample amplitudes to a number of levels related to the number of its respective order.

3. Transmission apparatus according to claim 2 further including means for deriving the average amplitudes of successive samples of said first and second order sequences and means for differentially combining said average amplitude samples and the amplitudes of intervening samples of a third order sequence to form second order differential samples.

4. A system for the transmission of message signals comprising means for sampling said message signals to form a series of signal samples, means for dividing said series of samples into a plurality of interleaved sample sequences of ascending order, means for quantizing the amplitudes of samples of a first order to a given number of levels, means for deriving sample amplitude differences from adjacent samples of different order sequences, means for quantizing said derived amplitude differences to succeedingly smaller numbers of levels, and means for transmitting said quantized sample amplitudes to a receiving station.

5. A system for the transmission of message signals according to claim 4 further including means for encoding said variously quantized sample amplitudes in permutation code groups of corresponding length.

6. A system for the transmission of communication signals comprising a transmitter and a receiver, means at said transmitter for deriving from said communication signals a plurality of intercalated sample sequences, means for encoding successive sample amplitudes of a first one of said sample sequences in permutation code groups having a given length, means for differentially combining said sample amplitudes of said first sequence with successive sample amplitudes of a second one of said sample sequences, means for encoding successive differential sample amplitudes from said combining means in permutation code groups having lengths substantially less than said given length, and means at said receiver for decoding and combining said code groups to produce the complete communication signal.

7. In a system for the transmission of message waves, means for reducing the required channel capacity comprising means for deriving a first set of samples from said message wave, means for quantizing the amplitudes of said first set of samples at a first number of quantizing levels to produce a first set of quantized samples, means for encoding the amplitudes of said first set of quantized samples, means for deriving a second set of samples from said message wave comprising samples falling midway between adjacent samples of said first set, means for deriving average amplitude samples from said adjacent samples of said first set, means for differentially combining samples of said second set and said average amplitude samples to produce a first set of differential samples, means for quantizing the amplitudes of said first set of differential samples at a second number of quantizing levels different from the number of quantizing levels of said first number to produce a second set of quantized samples, means for encoding the amplitudes of said second set of quantized samples, and means for transmitting said encoded sample amplitudes to a receiving terminal.

8. A system for the transmission of message waves according to claim 7 further including means for deriving a third set of samples from said message wave comprising samples falling midway between adjacent samples of said first and second sets, means for deriving average amplitude samples from said adjacent samples of said first and second sets, means for differentially combining samples of said third set and said average amplitude samples to produce a second set of differential samples, means for quantizing the amplitudes of said second set of differential samples at a third number of quantizing levels different from the number of quantizing levels of said first and said second number to produce a third set of quantized samples, and means for encoding the amplitudes of said third set of quantized samples.

9. A system for the transmission of message waves according to claim 8 in which said means for quantizing the amplitudes of said second set of differential samples comprises means for quantizing the sample amplitudes of said second differential set at a third number of quantizing levels less than said second number of quantizing levels and said means for quantizing the amplitudes of said first set of differential samples comprises means for quantizing the sample amplitudes of said first differential set at a second number of quantizing levels less than said first number of quantizing levels.

10. In combination, means for deriving from a signal to be transmitted a plurality of intercalated sample sequences, means for quantizing the amplitudes of a first one of said sequences to a given number of levels, means for subtracting the amplitudes of successive intersequential samples, and means for quantizing the amplitude differences thus obtained to smaller numbers of levels than said given number.

11. A television transmission system comprising means for deriving a series of samples from a television signal to be transmitted, means for subdividing said series of samples into a plurality of interleaved sample sequences, means for encoding the amplitude of each sample of a first one of said sequences into a first binary permutation code pulse group representing a first fixed number of discrete values, first means for combining adjacent samples of said first sequence and intermediate samples of a second sequences to form a first derived sequence, means for encoding the amplitude of each sample of said first derived sequence into a second binary permutation code pulse group representing a second fixed number of discrete values, second means for combining adjacent samples of said first and second sequences and intermediate samples of a third sequence to form a second derived sequence, and means for encoding the amplitude of each sample of said second derived sequence into a third binary permutation code pulse group representing a third fixed number of discrete values.

12. A television transmission system according claim 11 wherein said first and second combining means include amplitude averaging circuit means and amplitude subtractor circuit means.

13. A television transmission system according to claim 11 wherein said means for encoding the amplitude of each sample of said first sequence comprises means for encoding each sample amplitude of said first sequence into a binary code pulse group representing a first fixed number of discrete values greater than said second fixed number of discrete values and said means for encoding the amplitude of each sample of said first derived sequence comprises means for encoding each sample amplitude said first derived sequence into a binary code group representing a second fixed number of discrete values greater than said third fixed number of discrete values.

14. Transmission apparatus which comprises in combination with a signal source and an output terminal, means defining a first signal path from said source to said output terminal, said means including first signal sampling means, first quantizing means and first encoding means connected in tandem, means defining a second signal path from said source to said output terminal, said last-mentioned means including second signal sampling means, first amplitude subtractor means, second quantizing means and second encoding means connected in tandem, and circuit means for providing an input signal to said first subtractor means from said first quantizing means.

15. Transmission apparatus according to claim 14 wherein said first and second quantizing means include means for quantizing signals in said first and second signal paths to mutually different numbers of levels.

16. Transmission apparatus according to claim 14 further including means defining third and fourth signal paths from said source to said output terminal, said third and fourth paths each including third signal sampling means, second amplitude subtractor means, third quantizing means and third encoding means connected in tandem, and circuit means for providing an input signal to said second subtractor means from said first and second signal paths.

17. Transmission apparatus according to claim 16 wherein said first quantizing means includes means for quantizing said signal to one hundred and twenty-eight discrete levels, said second quantizing means includes means for quantizing said signal to sixteen discrete levels, and said third quantizing means each include means for quantizing said signal to four discrete levels.

18. Transmission apparatus according to claim 14 wherein said signal source comprises means for providing signals having a frequency bandwidth of four megacycles and each of said signal sampling means includes means for sampling said signal at a two megacycle rate.

19. A transmitting terminal for message signal waves comprising means for sampling said signal waves at regular intervals to form a plurality of intercalated sample sequences, a fine grade encoder for encoding the amplitudes of a first sample sequence of said samples, and succeedingly coarser encoders for encoding the amplitudes of the differences between the amplitudes of successive samples from different ones of said sample sequences, and means for transmitting in successive time periods the code pulse groups derived by said several encoders.

20. In combination with a source of a signal of which the amplitude varies with time, means for transmitting said signal to a distant point which comprises means for deriving from said signal an unbroken sequence of samples of its amplitudes, one at each of a regular set of sampling instants, means for selecting from said sample sequence a first subset of nonadjacent samples, between each two adjacent members of which occurs at least one sample that is not a member of said subset, means for grouping selected ones of said intervening samples into a second subset, means for quantizing the samples of said first subset to a preassigned degree of fineness, means for combining each sample of the second subset with an adjacent sample not of the second subset to derive a difference signal, and means for quantizing each said difference signal to a lesser degree of fineness.

References Cited in the file of this patent

UNITED STATES PATENTS

| | | |
|---|---|---|
| 2,438,908 | Goodall | Apr. 6, 1948 |
| 2,449,467 | Goodall | Sept. 14, 1948 |
| 2,568,721 | Deloraine et al. | Sept. 25, 1951 |
| 2,806,997 | Carbrey | Sept. 17, 1957 |
| 2,807,783 | Vasseur | Sept. 24, 1957 |